Aug. 13, 1946.     N. C. BEMENT     2,405,732
POSITIVE DRIVE DIFFERENTIAL
Filed Feb. 24, 1945
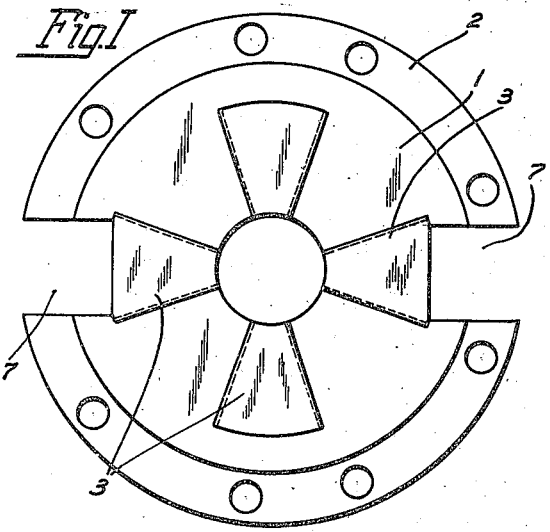
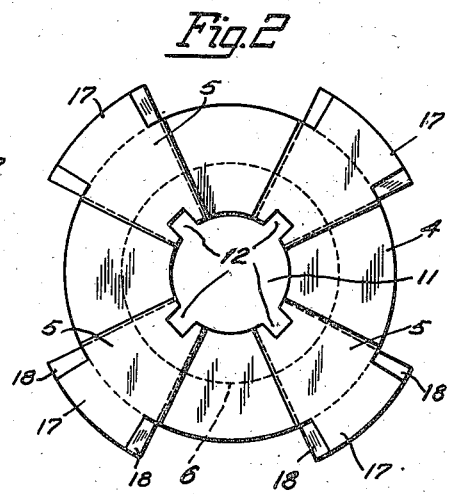
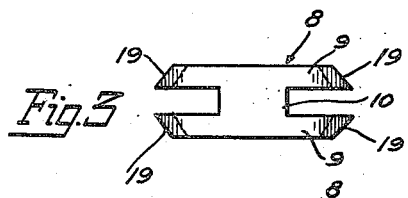
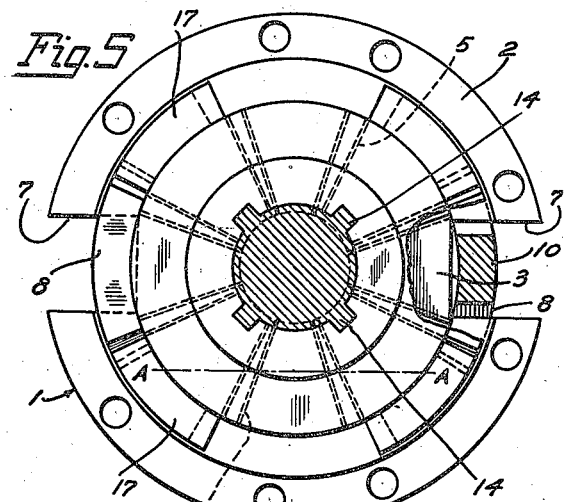
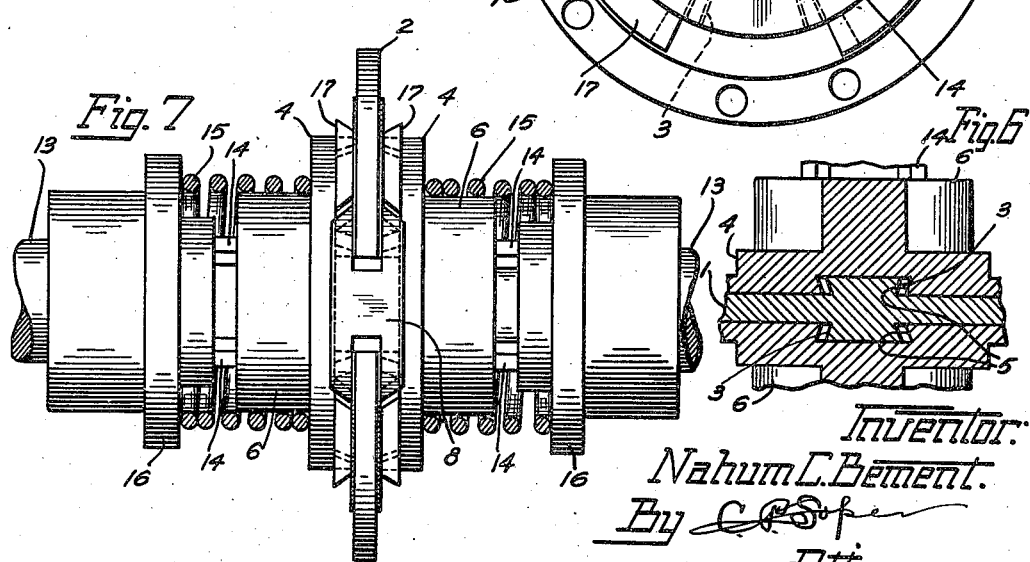
Inventor:
Nahum C. Bement.
By C. P. Soper
Atty.

Patented Aug. 13, 1946

2,405,732

UNITED STATES PATENT OFFICE 2,405,732

POSITIVE DRIVE DIFFERENTIAL

Nahum C. Bement, Rockford, Ill.

Application February 24, 1945, Serial No. 579,659

6 Claims. (Cl. 74—389.5)

This invention, which is an improvement on the structure shown in applicant's Patent 1,823,872, relates to driving mechanism for vehicles of various sorts and is of the kind commonly known as a positive drive differential.

The object of the invention is the provision of a differential of this character which will be strong and durable, which will consist of the minimum number of parts, so designed that they may be more easily assembled and which will substantially eliminate the backlash present in former devices of this character.

One of the features of the invention resides in a structure which permits the unclutching cams to be formed as unitary structures readily inserted in the driving member without the use of additional rivets or bolts. Another feature of the invention results from the proportion and relation of the parts of the differential, such that the driven blocks will nearly fill the spaces between the driving blocks so that the backlash of the driven members is substantially eliminated when reclutching occurs.

Other features and advantages will appear from time to time as the description of the invention progresses.

It is believed the invention will be readily understood from a description thereof in connection with the accompanying drawing in which there is disclosed, in somewhat simplified or schematic form, a preferred embodiment of the active elements of the differential. The usual housing and differential casing, which would, in practice, form part of the differential structure, have been omitted in order that the various elements may be more clearly seen in the drawing.

In the drawing,

Fig. 1 is a side view of the driving member of the differential, to which the usual ring gear will be connected, either directly or indirectly in an obvious manner;

Fig. 2 is a face view of one of the driven members and shows the side of the said member which, when the parts are assembled, will be adjacent to the side of the driving member illustrated in Fig. 1;

Fig. 3 is a side view of one of the throw-out or unclutching cams;

Fig. 4 is an edge view of the device of Fig. 3;

Fig. 5 illustrates the manner in which the driven member, shown in Fig. 2, will be associated with the driving member shown in Fig. 1;

Fig. 6 is a cross-section on the line A—A of Fig. 5; and

Fig. 7 shows how the various parts are assembled.

Referring now to the drawing in which the same reference characters indicate like parts in the different views, 1 is a disc-like driving member, to the outer rim 2 of which will be connected the usual ring gear (not shown) in any desired manner. Fixed with the web of the member 1, are a plurality of driving blocks 3 which, in the present form of the invention, are shown as being four in number. The sides of these blocks are radially arranged and are slightly undercut so that the engagement between the driving and driven blocks will be more secure. The driving member 1 will be provided, on its opposite side, with the same number of driving blocks and of the same character as the blocks 3.

It may be here explained that if a plane were passed through the center of the driving member 1 and parallel to the opposite faces thereof, all parts of the differential on one side of this plane would be exactly like the parts on the opposite side thereof. In other words, the differential is symmetrical as regards a plane passed through the driving member. Therefore, anything that is said about the mechanism on one side of the driving member will apply equally well to like mechanism on the other side thereof.

Referring now to Fig. 2, the driven member comprises, in part, a disc-like member 4 having on the face thereof four spaced driven clutch blocks 5. The blocks 5 are equa-distantly spaced about the disc 4 and, when the driven member is in assembled position, they fit between the driving blocks 3 on the driving member 1, but in such a manner that they do not quite fill the space between the driving blocks. The blocks 5 are undercut in the same manner as blocks 3, as indicated by the dotted lines and for the purpose previously mentioned. The relative arrangement of the blocks 3 and 5 are illustrated in Fig. 5. The driving blocks 3 and the driven blocks 5 will preferably be formed integrally with the driving member 1 and the driven member 4, respectively.

Fixed with each disc-like driven member 4 is a hub member 6 (Fig. 7). Reference to Fig. 6 will show the manner in which the driving blocks 3 engage the blocks 5 of the driven members on the opposite sides thereof as the vehicle moves forward or backward. The driving member 1 is provided, in its opposite edges, with inwardly extending notches indicated at 7 in Fig. 1 of the drawing. Each of these notches is of a size to loosely receive one of the throw-out cam members 8, shown in Figs. 3 and 4. Each cam member 8 is preferably formed as an integral unit and may be described as being of a slightly curved, H-shaped formation, comprising leg members 9 and a connecting member 10. The cam member 8 is positioned with the legs 9 thereof positioned on the opposite sides of the web of the driving member 1 and the connecting member 10 positioned in the notch 7, as indicated in Fig. 5.

The driven member 4 is provided, centrally, with a generally circular opening 11, having the splineway extensions 12 positioned in the inner ends of the blocks 5, respectively. The splineways also extend along the collars or sleeves 6. Loosely, but non-rotatively, mounted within each of the driven members is an axle shaft, such as indicated at 13 in Fig. 7. Each axle shaft is provided with splinings 14 arranged to be received by the splineways 12 of the hub 6 and the driven member 1, as indicated in Fig. 5.

It will be understood that the axle shafts 13 are similar to those provided in the usual motor vehicle and that the outer end of each of them will be equipped with a wheel in the usual manner. As previously explained, the driven members 4, 4 will be mounted in like manner on the opposite sides of the driving member 1, as shown in Fig. 7, and the two axle shafts 13 extending thereinto or therethrough will be arranged in alignment with their inner ends adjacent to each other and also adjacent to the driving member 1 at the center thereof. Resilient means are provided to normally urge each of the driven members towards the driving member 1. In the present case, a coil spring 15 is provided about the hub 6 of each driven member, the inner ends of the springs 15 engaging the members 4 and the outer ends thereof engaging fixed abutments 16 which may be part of the casing or housing of the differential. It will be understood that one of the cam members 8 will be positioned in each of the notches 7 of the driving member 1 and that these cam members will be retained in position by the ring gear or other mechanism which is attached to the rim 2. Also, it should be noted that the driven blocks 5 are provided with extensions 17, the opposite edges of which are beveled to provide inwardly converging cam surfaces 18. The cam surfaces 18 are adapted to cooperate with the cam surfaces 19 of the cam member 8 to declutch one of the driven members whenever the vehicle is traveling in a circle so that one wheel tends to move faster than the other in a manner which is well understood.

Assuming now that the vehicle is directed either forward or backward in a direct line and that power is being applied to the driving member 1 in an obvious manner, the rotation of the member 1 will be conveyed to the members 4 on the opposite sides thereof, through the medium of the interacting driving blocks 3 and driven blocks 5. Thus, it will be readily understood how each axle shaft 13 will be positively driven by the driving member 1 and a driven member 4 so long as the vehicle is traveling along a straight line. If, however, the vehicle is guided so as to move in a circle or from the straight line, the outer wheel will tend to move faster than the inner wheel. In such a case, the driven member on the outer side of the curve will tend to move faster than the driving member, and the cams 18 at the opposite sides thereof and adjacent to the unclutching cams 19 will ride up on the cams 19 of the unclutching members and remove the driven blocks 5 of that driven member from engagement with the driving blocks 3. In other words, in this case, the driven member will be moved outwardly from the driving member 1 so that the blocks 5 thereof can no longer be engaged by the driving blocks 3, and the outer wheel can turn without hindrance.

When, however, the vehicle again moves either forwardly or backwardly in a substantially straight line, the cams at the ends of the driven blocks will ride down off from the throw-out cam members 8, and the spring 15 will force the driven member again into operative driven relation to the driving member 1. This same operation occurs regardless of whether the vehicle is traveling forward or backward. So long as the vehicle moves in a substantially straight line, both wheels are positively driven but, if the vehicle moves from a straight line, as in a circle, the driven clutch member associated with the outer wheel will be declutched, permitting the outer wheel to move freely. It may be here explained that the connecting member 10 of the cam 8 is of less length than the width of the notches 7. Therefore, the throw-out cam is permitted a slight forward and back movement in relation to the driving member 1. This is necessary in order that the cam member 8 may function in the required manner.

Assuming that the car is traveling forwardly, but in a circle, the driven member associated with the inner wheel will be positively driven from the driving member and, therefore, the blocks 5 thereof will be in close engagement with the cooperating blocks 3 of the driving member. In this position, the cams 18 of the driven member, associated with the wheel which is on the inner side of the arc in which the vehicle is traveling, will be in engagement with the adjacent cams 19 of the members 8 and will retain the unclutching members in such a position that the cams 19 on the opposite legs 9 thereof will be retained rearwardly of the adjacent blocks 3. Thus, when the driven member of the outer wheel moves forwardly, the cams 18 thereof will engage the rearwardly positioned cams 19, and cams 18 and 19 will coact to unclutch the outer wheel. In case the vehicle is backing or moving rearwardly, exactly the reverse operation will take place. It is obvious that, when the vehicle is moving in a substantially straight line, both driven members will be firmly clutched to the driving member, and no unclutching of either driven member can occur.

It will be readily seen that applicant has produced a positive drive differential in which backlash, at the time reclutching takes place, has been practically eliminated and by the use of unitary unclutching members which are readily installed or assembled in position merely by inserting them in the peripheral notches in the driving disc. The structure disclosed is smoother in performance and also stronger and more durable than the prior structures.

Many minor modifications can be made in the details of the invention without departing from the spirit thereof. The invention, therefore, should be limited only by the scope of the appended claims.

Having thus described my invention, what I claim as new and desire to secure by Letters Patent of the United States is:

1. In a differential, a driving member, driving clutch blocks fixed with said driving member and projecting from the opposite sides thereof, a pair of axle shafts extending transversely of said driving member in substantial alignment with the inner ends thereof adjacent to said driving member and to each other, a pair of driven clutch members on opposite sides respectively of said driving member and non-rotatively mounted on said axle shafts, respectively, driven clutch blocks fixed with each of said driven members and normally arranged in operative position between the driving clutch blocks on said driving member, peripheral notches in said driving member, an unclutching cam member loosely mounted in each of said notches, cam surfaces on said unclutching members, cam blocks fixed with said driven members, respectively, the cam surfaces of said blocks being arranged, upon rotation of its corresponding axle shaft faster than the other said axle shaft, to cooperate with cam surfaces of said unclutching members to effect disengagement of the driven clutch blocks of its driven member from the driving blocks on the adjacent side of said driving member and resilient means urging each of said driven members toward said driving member.

2. In a differential, a driving member, driving clutch blocks fixed with said driving member and projecting from the opposite sides thereof, a pair of axle shafts extending transversely of said driving member in substantial alignment with the inner ends thereof adjacent to said driving member and to each other, a pair of driven clutch members on opposite sides, respectively, of said driving member and non-rotatively mounted on said axle shafts, respectively, driven clutch blocks fixed with each of said driven members and arranged to be normally positioned between the driving clutch blocks on said driving member, notches in said driving member extending radially inwardly from the periphery thereof, unclutching cam members loosely mounted in said notches, respectively, cam surfaces on said unclutching members, cam blocks fixed with said driven members, respectively, the cam surfaces of said blocks being arranged, upon rotation of its corresponding axle shaft faster than the other said axle shaft, to cooperate with cam surfaces of said unclutching members to effect disengagement of the driven clutch blocks of its driven member from the driving blocks on the adjacent side of said driving member and resilient means urging each of said driven members toward said driving member.

3. In a positive drive differential, a disc-like driving member, four driving clutch blocks fixed with said driving member on each side thereof, a pair of axle shafts extending transversely of said driving member in substantial alignment with the inner ends thereof adjacent to said driving member and to each other, a pair of driven clutch members, one on each side of said driving member and non-rotatively mounted on said axle shafts, respectively, four driven clutch blocks fixed with each of said driven members and arranged to be normally positioned between the driving clutch blocks on said driving member, notches in said driving member extending radially inwardly from the periphery thereof, a generally H-shaped unclutching cam member loosely mounted in each of said notches, outwardly converging cam surfaces in which the opposite legs of said unclutching members terminate, cam blocks fixed with said driven members, respectively, the cam surfaces of said blocks being pitched oppositely to the cams on said unclutching members and arranged upon rotation of its corresponding axle shaft faster than the other said axle shaft, to cooperate with cam surfaces of said unclutching members to effect disengagement of the driven clutch blocks of its driven member from the driving blocks on the adjacent side of said driving member and resilient means urging each of said driven members toward said driving member.

4. In a positive drive differential, a disc-like driving member, driving clutch blocks fixed with said driving member and projecting from the opposite sides thereof, a pair of axle shafts extending transversely of said driving member in substantial alignment with the inner ends thereof adjacent to said driving member and to each other, a pair of driven clutch members on opposite sides, respectively, of said driving member and non-rotatively mounted on said axle shafts, respectively, driven clutch blocks fixed with each of said driven members and arranged to be normally positioned between the driving clutch blocks on said driving member, notches in said driving member extending radially inwardly from the periphery thereof, generally H-shaped unclutching cam members loosely mounted in said notches, respectively, outwardly converging cam surfaces in which the opposite legs of said unclutching members terminate, cam blocks fixed with said driven members, respectively, the cam surfaces of said blocks being pitched oppositely to the cams on said unclutching members and arranged, upon rotation of its corresponding axle shaft faster than the other said axle shaft, to cooperate with cam surfaces of said unclutching members to effect disengagement of the driven clutch blocks of its driven member from the driving blocks on the adjacent side of said driving member and resilient means urging each of said driven members toward said driving member.

5. In a positive drive differential, a disc-like driving member, driving clutch blocks fixed with said driving member and projecting from the opposite sides thereof, a pair of axle shafts extending transversely of said driving member in substantial alignment with the inner ends thereof adjacent to said driving member and to each other, a pair of driven clutch members on opposite sides, respectively, of said driving member and non-rotatively mounted on said axle shafts, respectively, driven clutch blocks fixed with each of said driven members and arranged to be normally positioned between the driving clutch blocks on the adjacent side of said driving member, a notch in said driving member extending radially inwardly from the periphery thereof, an unclutching cam member, said driving member being provided with a peripheral notch in which said unclutching member is loosely mounted, cam surfaces on said unclutching member, cam blocks fixed with said driven members, respectively, the cam surfaces of said blocks being arranged, upon rotation of its corresponding axle shaft faster than the other said axle shaft in either direction, to cooperate with a cam surface of said unclutching member to effect disengagement of the driven clutch blocks of its driven member from the driving blocks on the adjacent side of said driving member and resilient means urging each of said driven members toward said driving member.

6. A positive drive differential for motor vehicles comprising a driving member, a pair of axle shafts arranged in alignment transversely of said driving member with the inner ends thereof adjacent to each other and to the center of said driving member, driving blocks on each side of said driving member, driven members, one on each side of said driving member, driven blocks on each driven member arranged to cooperatively engage the corresponding driving blocks on said driving member, means slidably but non-rotatively joining each of said driven blocks, respectively, to the corresponding axle shaft, a unitary throw-out block, a slot in said driving member extending circumferentially thereof in which said throw-out block has limited movement, said driving member being cut away to provide an enlargement to said slot at one side thereof through which said throw-out block may be assembled in said slot, and cooperating cam surfaces on said throw-out block and said driven blocks arranged to remove a driven block from operative engagement with said driving blocks incident to one of said axle shafts rotating faster than the other.

NAHUM C. BEMENT.